(12) United States Patent
Goerigk et al.

(10) Patent No.: US 6,969,492 B1
(45) Date of Patent: Nov. 29, 2005

(54) EXHAUST-GAS CLEANING SYSTEM WITH NITROGEN OXIDE REDUCTION AND WITH THE ADDITION OF REDUCING AGENT

(75) Inventors: Christian Goerigk, Hemmingen (DE); Stefan Wessels, Weissach-Flacht (DE)

(73) Assignees: DaimlerChrysler AG, Stuttgart (DE); Dr. Ing. h.c.F. Porsche Aktiengesellschaft, Stuttgart (DE); Volkswagen Aktiengesellschaft, Wolfsburg (DE); Audi Aktiengesellschaft, Ingolstadt (DE); Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/574,203

(22) Filed: May 19, 2000

(30) Foreign Application Priority Data

May 19, 1999 (DE) ................................ 199 22 959

(51) Int. Cl.[7] .......................... B01D 53/56; F01N 3/20
(52) U.S. Cl. ...................................... 422/177; 422/172
(58) Field of Search ................ 422/168–177, 422/180, 205; 60/301, 303, 295, 324

(56) References Cited

U.S. PATENT DOCUMENTS 5,628,186 A    5/1997  Schmelz 5,881,475 A  *  3/1999  Hofmann et al. ............. 60/274
6,444,177 B1 *  9/2002  Muller et al. ................ 422/177

FOREIGN PATENT DOCUMENTS

| DE | 19510804 | 9/1996 |
| DE | 19513250 | 10/1996 |
| DE | 19913462 | 9/2000 |
| EP | 0 615 777 B1 | 8/1997 |
| EP | 0 555 746 B1 | 9/1997 |
| WO | WO 97/01387 | * 1/1997 |
| WO | WO 97/36676 | * 10/1997 |

OTHER PUBLICATIONS

German Search Report mailed Nov. 3, 2003.

* cited by examiner

*Primary Examiner*—Hien Tran
(74) *Attorney, Agent, or Firm*—Crowell & Moring LLP

(57) ABSTRACT

An exhaust-gas cleaning system includes a nitrogen oxide reduction catalytic converter for reducing nitrogen oxides which are contained in the exhaust gas. A reducing agent is introduced into the exhaust-gas flow and is in the form of a vapor. A reducing-agent metering device for the metered addition of the reducing agent or a reducing-agent precursor to the exhaust-gas flow includes a vaporizer, which is arranged in the exhaust system upstream of the nitrogen oxide reduction catalytic converter. As a heat source, the vaporizer has (1) a heatable deflector surface, onto which the reducing agent, which is supplied by a feed unit, is directed under pressure; or (2) a microwave generator.

5 Claims, 1 Drawing Sheet

EXHAUST-GAS CLEANING SYSTEM WITH NITROGEN OXIDE REDUCTION AND WITH THE ADDITION OF REDUCING AGENT

BACKGROUND AND SUMMARY OF INVENTION

This application claims the priority of German patent document 199 22 959.7, filed May 19, 1999, the disclosure of which is expressly incorporated by reference herein.

The invention relates to an exhaust-gas cleaning system. Exhaust-gas cleaning systems are used, for example, for internal-combustion engines of motor vehicles and enable any nitrogen oxides contained in the exhaust gas to be cleaned out using the so-called SCR (Selective Catalytic Reduction) process. In this process, the nitrogen oxides are chemically reduced in a suitable reduction catalytic converter with the participation of a suitable reducing agent which is added to the exhaust-gas flow. Ammonia in vapour or gas form is often used as the reducing agent and is generated by the vaporization and subsequent thermolysis and hydrolysis of urea which has preferably been introduced into the exhaust-gas flow in solution.

An exhaust-gas cleaning system of this type is disclosed in publication WO 97/36676. In this system, liquid urea solution is vaporized in an electrically heatable metering unit, which is arranged on an exhaust pipe wall, with the urea being hydrolysed and is injected into the exhaust-gas flow. A downstream mixer assists with mixing the injected reducing agent with the exhaust gas.

EP 0,555,746 B1 discloses a metal honeycomb vaporizer, which is heated by the exhaust gas and serves simultaneously as a hydrolysis catalytic converter for injected urea solution and a flow mixer. Downstream of the metal honeycomb vaporizer body in the exhaust system there is a multipart catalytic converter unit which comprises an upstream nitrogen oxide reduction catalytic converter and a downstream oxidation catalytic converter.

In an exhaust-gas cleaning system which is disclosed in Patent EP 0,615,777 B1, urea is injected into the exhaust-gas flow in the form of solid particles, which is then fed to a hydrolysis catalytic converter and, from there, to a nitrogen oxide reduction catalytic converter and a downstream oxidation catalytic converter.

The invention is based on the technical problem of providing an exhaust-gas cleaning system in which the reducing agent can be added to the exhaust-gas flow as a vapour in an advantageous manner and with relatively little outlay for the purpose of nitrogen oxide reduction.

The exhaust-gas cleaning system of the present invention solves this problem. In the system according to the present invention, the vaporizer which is arranged in the exhaust system upstream of the nitrogen oxide reduction catalytic converter contains, as its heat source, either a heatable deflector surface, onto which the reducing agent, which is supplied by a feed unit, is directed under pressure, or a microwave generator. It has been found that, firstly it is possible to achieve sufficient vaporization of the reducing agent and, secondly, the cost of providing the vaporizer remains relatively low.

In an embodiment of the exhaust-gas cleaning system, the heat source provided for the vaporizer is a baffle plate which is oriented parallel to the direction of flow of the exhaust gas and therefore does not significantly disrupt the exhaust-gas flow, so that there is no significant drop in the exhaust-gas pressure across the vaporizer. The baffle plate may be positioned with surface-to-surface contact against the inside of an exhaust pipe or may be positioned in the interior of the latter. The heating may be effected in a conventional way which is suitable for the particular application, for example by means of an associated electrical heater unit.

In another embodiment of the exhaust-gas cleaning system, the heat source provided for the vaporizer is a heatable baffle plate which is situated in a part-flow branch line of the exhaust system, this branch line branching off from a main-flow exhaust system section and opening back into this section downstream of the branching point.

Another embodiment of the exhaust-gas cleaning system contains at least two catalytic converter stages which are connected one behind the other, having different ammonia storage performances and at least one of which forms the nitrogen oxide reduction catalytic converter. It has been found that in certain cases this measure is advantageous in order to achieve the maximum possible reduction of nitrogen oxide, and, depending on the particular application, the upstream stage may have a higher or lower ammonia storage capacity than the downstream stage.

Other objects, advantages and novel features of the present invention will become apparent from the following detailed description of the invention when considered in conjunction with the accompanying drawings.

DETAILED DESCRIPTION OF THE DRAWINGS

Figure 1:
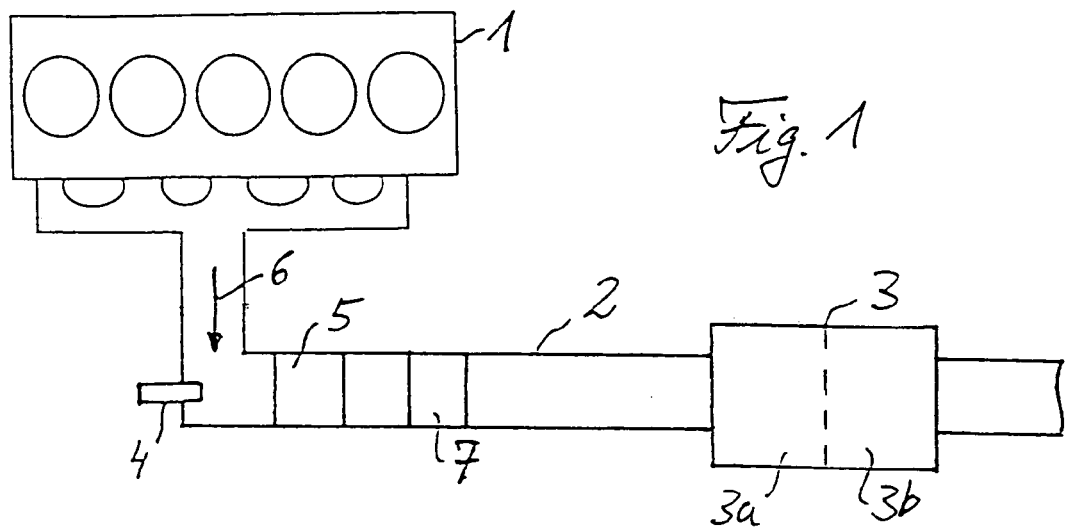
FIG. 1 shows a diagrammatic block diagram of an internal-combustion engine with an exhaust-gas cleaning system having a microwave generator vaporizer.

FIG. 1 diagrammatically depicts an internal-combustion engine 1 which is used, for example, in a motor vehicle and has an associated exhaust-gas cleaning system for cleaning the engine exhaust gas, in particular for removing nitrogen oxides which may be contained therein. The nitrogen oxides are produced in particular when internal-combustion engines run in lean mode.

To clean nitrogen oxides out of the exhaust gas, the exhaust-gas cleaning system contains a nitrogen oxide reduction catalytic converter 3 which is positioned in the exhaust system 2 of the internal-combustion engine 1. This converter may be of single-stage or multistage design, FIG. 1 illustrating, by way of example, a two-stage design with an upstream stage 3a and a downstream stage 3b. The ammonia storage capacity of the two catalytic converter stages 3a, 3b preferably differs, in which case the upstream catalytic converter stage 3a has a lower or higher ammonia storage capacity than the downstream catalytic converter stage 3b, as required.

Furthermore, upstream of the nitrogen oxide reduction catalytic converter 3, the exhaust-gas cleaning system contains, in the exhaust system 2, a reducing-agent metering device which has a feed unit 4 and a vaporizer 5. By means of the feed unit 4, a reducing agent or a precursor thereof (e.g., solid or liquid urea) is injected from the outside into the single-part exhaust system 2, in which the exhaust-gas flow 6 which has been collected and comes from the individual engine cylinders is guided. The vaporizer 5 is positioned downstream of the metering point in the exhaust system 2 and contains, as its heat source, a microwave generator, which is of a standard type and therefore is not explained further here. Under the action of the microwave radiation generated by the microwave generator, injected urea is hydrolysed in the vaporizer 5 to form gaseous ammonia and carbon dioxide. To assist with the hydrolysis reaction, the vaporizer 5 may contain a suitable hydrolysis catalyst.

In the exhaust system section between the vaporizer 5 and the nitrogen oxide reduction catalytic converter 3, there is a gas mixer 7 of standard design, by means of which the reducing agent which has been vaporized in the vaporizer 5 is mixed homogeneously with the exhaust gas which is to be cleaned. In addition, where necessary the gas mixer 7 may be designed in such a way that it additionally functions as a urea hydrolysis catalytic converter and/or has a nitrogen-oxide-reducing function. Then, in the subsequent nitrogen oxide reduction catalytic converter 3, the complete selective chemical reduction of the nitrogen oxides contained in the exhaust gas to form nitrogen takes place with the participation of the reducing agent which is in vapour form.

Depending on requirements, it is additionally possible for further catalytic converters with the function of cleaning the exhaust gas, such as an oxidation catalytic converter or a three-way catalytic converter, to be arranged in series upstream or downstream of the nitrogen oxide reduction catalytic converter 3, either as independent catalytic converter bodies or integrated with the nitrogen oxide reduction catalytic converter 3 in a common catalytic converter unit.

Figure 2:
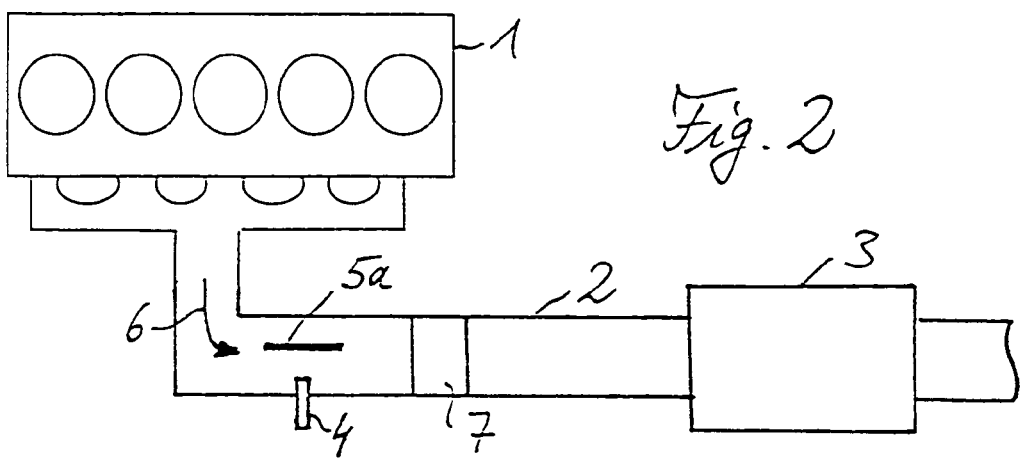
FIG. 2 shows an illustration corresponding to FIG. 1, but with an exhaust-gas cleaning system having a baffle-plate vaporizer lying in the exhaust-gas main flow.

FIG. 2 shows a variant of the exhaust-gas cleaning system from FIG. 1, the same reference numerals being used for functionally identical components as those in FIG. 1, for the sake of simplicity, and to this extent reference may be made to the above description of FIG. 1. Instead of the microwave vaporizer 5 of the system shown in FIG. 1, the exhaust-gas cleaning system shown in FIG. 2 has a baffle-plate vaporizer, which comprises a heatable baffle plate 5a which is heated in a standard way, which is therefore not shown in more detail, for example electrically.

The vaporizing baffle plate 5a is situated in the interior of the single-part exhaust system 2, which is formed by a corresponding exhaust pipe, at a distance from the pipe wall, and is oriented parallel to the longitudinal axis of the exhaust pipe section. Accordingly, the plane of this plate also lies parallel to the main direction of flow of the exhaust-gas flow 6 flowing around it, so that its narrow side has only a minimal effect on the cross section of flow of the exhaust pipe.

The reducing-agent feed unit 4, which is designed as an injection unit or injection nozzle and is fitted into an associated opening in the exhaust pipe, lies opposite to and at a distance from the impact side of the baffle plate 5a. Via the injection unit 4, the reducing agent or the reducing-agent precursor, such as dissolved urea, is sprayed under pressure onto that side of the heated baffle plate 5a which faces it and as a result is vaporized into the exhaust-gas flow 6. The downstream gas mixer 7 ensures that the vaporized reducing agent or reducing-agent precursor is sufficiently mixed with the exhaust gas. In addition, if necessary, the gas mixer 7 may again fulfil the additional function of converting a reducing-agent precursor which has been metered into the exhaust gas in vapour form into the desired reducing agent, for example of converting urea vapour into gaseous ammonia by hydrolysis. In addition, if necessary, the baffle plate 5a may be provided with a catalytically active coating, for example with a hydrolysis catalyst for converting urea into ammonia. Otherwise, the same advantageous properties and possible modifications as listed above for the system shown in FIG. 1 also apply to the system shown in FIG. 2.

Figure 3:
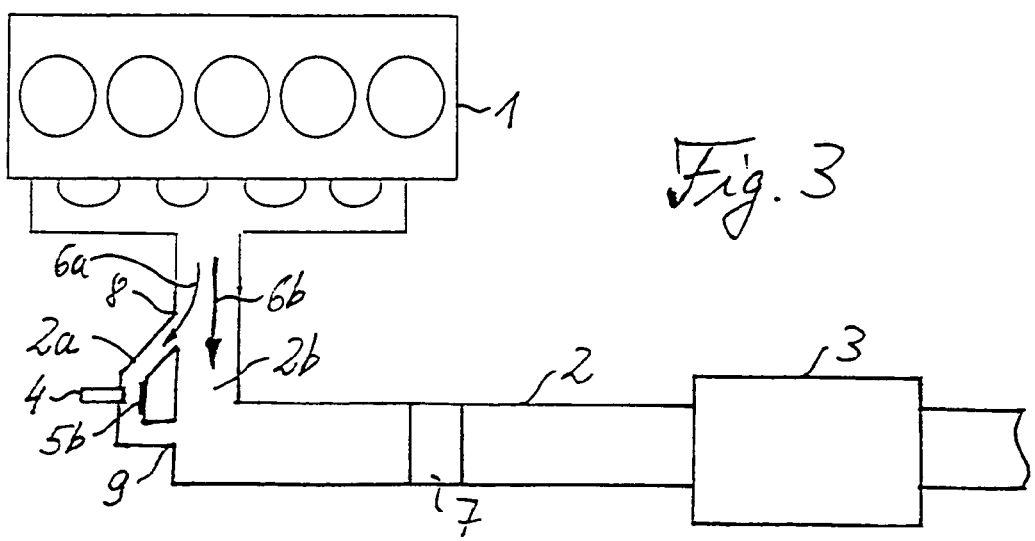
FIG. 3 shows an illustration corresponding to FIG. 1, but with an exhaust-gas system having a baffle-plate vaporizer arranged in a part-flow branch line.

FIG. 3 shows a variant of the exhaust-gas cleaning system from FIG. 2, in which, instead of the baffle-plate vaporizer 5a arranged in the exhaust-gas main flow as in the system shown in FIG. 2, a vaporizer, which is again designed as a heatable baffle plate 5b, is arranged in a part-flow branch line 2a of the exhaust system 2. At an outlet point 8, the part-flow branch line 2a branches off from the main-flow exhaust system section 2b of the exhaust system 2 and, at a downstream inlet point 9, opens back into the main-flow exhaust system section 2b. Accordingly, in this area, the exhaust-gas flow is divided into a main exhaust-gas flow 6b, which remains in the main-flow exhaust system section 2b and contains most of the exhaust gas, and a partial exhaust-gas flow 6a, which flows through the part-flow branch line 2a and contains less exhaust gas.

In the part-flow branch line 2a, the heatable baffle plate 5b is arranged on a wall of the associated pipe, while the reducing-agent feed unit 4, which is designed as an injection nozzle, is fixed in an opening in the opposite pipe wall area. The injection nozzle 4 in this way lies opposite to and at a distance from the heatable baffle plate 5b and, in operation, sprays the reducing agent or reducing-agent precursor with which it has been supplied, under pressure, onto the facing, hot side of the baffle plate 5b. As a result, the reducing agent or reducing-agent precursor is vaporized and is entrained by the partial exhaust-gas flow 6a, with which it is then combined with the main exhaust-gas flow 6b which bypasses the baffle-plate vaporizer 5b. In the downstream gas mixer 7, the vaporized reducing agent or reducing-agent precursor is mixed homogeneously with the exhaust gas over the entire exhaust pipe cross section and, in the process, if a reducing-agent precursor is involved, is at the same time converted into the desired reducing agent, which is then available for the reduction of nitrogen oxides in the downstream nitrogen oxide reducing-agent catalytic converter 3. Otherwise, the same properties, advantages and possible variations as those indicated above with reference to the systems shown in FIGS. 1 and 2 also apply to the system shown in FIG. 3.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An exhaust-gas cleaning system, comprising:
    a nitrogen oxide reduction catalytic converter for reducing nitrogen oxides contained in an exhaust gas; and
    a reducing-agent metering device for metered addition of the reducing agent or a reducing-agent precursor to the exhaust gas,
    wherein said reducing-agent metering device comprises:
        a feed unit;
        a vaporizer arranged upstream of the nitrogen oxide reduction catalytic converter; and
        a heat source disposed in the exhaust gas, the heat source comprising a single baffle plate, the baffle plate being oriented with its planar faces parallel to a direction of flow of the exhaust gas,
        wherein the reducing agent is directed by the feed unit toward the single baffle plate under pressure at a substantially perpendicular angle onto one of the planar faces of the baffle plate.

2. An exhaust-gas cleaning system according to claim 1, wherein a surface of the baffle plate is arranged against an inside surface of a pipe of the exhaust-gas cleaning system or is arranged in an interior of the pipe.

3. An exhaust-gas cleaning system according to claim 1, wherein the exhaust gas flows through a main-flow exhaust system section, and the deflector plate is arranged in a part-flow branch line of the exhaust-gas cleaning system that branches off from the main-flow exhaust system section at a branching point and opens back into the main-flow exhaust system section downstream of the branching point.

4. An exhaust-gas cleaning system according to claim 1, further comprising two catalytic converter stages connected in series, wherein each catalytic converter stage has a different reducing-agent storage capacity and wherein at least one of the catalytic converter stages forms the nitrogen oxide reduction catalytic converter.

5. A motor vehicle internal combustion engine comprising the exhaust-gas cleaning system according to claim 1.

* * * * *